United States Patent [19]

Roe et al.

[11] Patent Number: 5,176,799
[45] Date of Patent: Jan. 5, 1993

[54] EVAPORATOR WITH SOLVENT RECOVERY FEATURE

[75] Inventors: John S. Roe, Millis; Larry A. Simonson, Ashland, both of Mass.

[73] Assignee: Zymark Corporation, Hopkinton, Mass.

[21] Appl. No.: 662,151

[22] Filed: Feb. 28, 1991

[51] Int. Cl.$^5$ ............................................. B01D 3/00
[52] U.S. Cl. ................................ 202/185.3; 159/16.1; 202/187; 202/189; 202/237; 202/267.1; 203/49; 203/86; 422/101
[58] Field of Search ............... 203/49, 86, DIG. 2; 202/185.3, 189, 185.5, 237, 267.1, 187; 422/101; 159/16.1

[56] References Cited

U.S. PATENT DOCUMENTS

| | | | |
|---|---|---|---|
| 2,427,718 | 9/1947 | Denys | 203/49 |
| 2,476,477 | 7/1949 | Berg | 203/DIG. 2 |
| 2,608,528 | 8/1952 | Piros et al. | 203/DIG. 2 |
| 2,647,823 | 8/1953 | Van Wessem et al. | 203/DIG. 2 |
| 2,712,520 | 7/1955 | Nester | 203/DIG. 2 |
| 3,177,126 | 4/1965 | Charreau | 203/49 |
| 4,006,062 | 2/1977 | Bhuchar et al. | 203/DIG. 2 |
| 4,052,267 | 10/1977 | McFee | 202/185.3 |
| 4,243,526 | 1/1981 | Ransmark | 203/49 |
| 4,331,514 | 5/1982 | Bauer | 202/234 |
| 4,437,940 | 3/1984 | Sussmeyer et al. | 203/49 |
| 4,492,951 | 1/1985 | Apothaker et al. | 203/DIG. 2 |
| 4,534,828 | 8/1985 | Erickson et al. | 203/49 |
| 4,595,459 | 6/1986 | Kusakawa et al. | 203/49 |
| 4,929,312 | 5/1990 | Westcott | 202/170 |
| 5,017,500 | 5/1991 | Langer | 203/DIG. 2 |
| 5,078,880 | 1/1992 | Barry | 203/49 |

FOREIGN PATENT DOCUMENTS

| | | | |
|---|---|---|---|
| 2379482 | 10/1978 | France | 203/49 |
| 1-015101 | 1/1989 | Japan | 203/49 |

*Primary Examiner*—Virginia Manoharan
*Attorney, Agent, or Firm*—John E. Toupal; Harold G. Jarcho

[57] ABSTRACT

An evaporation apparatus including a vessel defining an opening at the top thereof and forming an evaporation chamber to hold a liquid composition; a condenser assembly disposed above and hermetically sealed to the vessel and having a wall defining a condensation chamber communicating with the evaporation chamber through the opening, an accumulator for receiving liquid condensed on the wall, and a drain for removing liquid received by the accumulator; a fluid drive disposed above the condenser assembly and adapted to produce fluid flow downwardly through the condensation chamber and into contact with the liquid composition in the evaporation chamber and then upwardly into the condensation chamber; a heating mechanism for heating the liquid composition in the evaporation chamber so as to cause evaporation thereof; and a cooling means for cooling the wall so as to produce condensation thereon of vapor included in the fluid flowing upwardly from the evaporation chamber.

14 Claims, 3 Drawing Sheets

EVAPORATOR WITH SOLVENT RECOVERY FEATURE

BACKGROUND OF THE INVENTION

Evaporation is a common technique used in modern analytical chemistry laboratories. It is frequently used to concentrate the end product of extraction operations for further analysis by techniques such as gas or liquid chromatography.

In environmental analysis, the volume of extract solvent that needs to be concentrated is usually large 200-500 ml. An evaporation method called Kuderna-Danish is used widely in this respect. However, this procedure has drawbacks: it is slow, recoveries of dissolved analytes in the concentrated fraction are poor, the glassware used is expensive and fragile, and the process is difficult to automate.

An improved technique for evaporating solvent for analyte concentration is found in Friswell, U.S. Pat. No. 4,707,452. Using this method a stream of gas is directed in a helical path down the inside wall of an open evaporation vessel seated in a temperature controlled bath. This method provides a more efficient solvent evaporation, thus allowing for the use of lower bath temperatures to prevent the degradation of temperature-labile analytes dissolved in the solvent inside the evaporation vessel. However, the Friswell system does exhibit certain disadvantages. First, a large amount of gas is required to accomplish evaporation. Inert gases such as argon or nitrogen are commonly used for this purpose, and although readily available, they are expensive in the preferred highly pure form. Second, the vapors from the solvents evaporated, typically organic solvents like chloroform and hexane, are toxic. Good laboratory practice mandates that evaporated solvent vapors be removed by standard laboratory ventilation hood systems. Current federal and state environmental regulations govern the release of small amounts of these vapors in this way, but larger amounts can cause problems for laboratories. Third, the purified solvents evaporated are costly and recovery of the evaporated solvent for recycling would be desirable.

The object of this invention, therefore, is to provide an improved evaporation apparatus which provides for solvent recovery.

SUMMARY OF THE INVENTION

The invention is an evaporation apparatus including a vessel defining an opening at the top thereof and forming an evaporation chamber to hold a liquid composition; a condenser assembly disposed above and hermetically sealed to the vessel and having a wall defining a condensation chamber communicating with the evaporation chamber through the opening, an accumulator for receiving liquid condensed on the wall, and a drain for removing liquid received by the accumulator; a fluid drive disposed above the condenser assembly and adapted to produce fluid flow downwardly through the condensation chamber and into contact with the liquid composition in the evaporation chamber and then upwardly into the condensation chamber; a heating mechanism for heating the liquid composition in the evaporation chamber so as to cause evaporation thereof; and a cooling means for cooling the wall so as to produce condensation thereon of vapor included in the fluid flowing upwardly from the evaporation chamber. Operational efficiency is improved by the accumulator which recovers solvent for reuse.

According to one feature of the invention, the wall includes a substantially vertical condensation tube, the accumulator is an annular trough terminating a bottom of the tube, and the drain is a port in a bottom of the trough. Solvent is conveniently recovered by the annular trough at the base of the tubular condensation wall.

According to other features of the invention, the cooling means comprises an annular shroud surrounding the condensation tube and defining a fluid inlet port and a fluid outlet port, and the tube, the annular trough and the annular shroud are an integrally formed unit. These features simplify use of the apparatus and reduce its fabrication costs.

According to other features of the invention, the fluid drive comprises a fan, and an assembly defining an air tightly sealed fan chamber retaining the fan and communicating with the condensation chamber, and the fan is adapted to produce air flow in directions radial with respect to the tube. The tubular condensation chamber and radially directed air flow result in a helical path of air flow that creates a vortex in the gas above the liquid composition and thereby enhances the evaporation process.

According to yet another feature of the invention, the fan assembly comprises a dome shaped enclosure enclosing the fan and having an open bottom end sealed to an upper end of the tube. The domed enclosure assists in the creation of the desired vortex.

According to a further feature, the invention includes a closed supply housing sealed between the condenser and the vessel, and defining a feed port for injecting a solvent into the vessel. Provision of the feed port allows for the injection of additional solvent during the evaporation process.

According to a further feature of the invention, the tube, the annular trough and the supply housing are an integrally formed unit. These features simplify comprehensive use of the apparatus and reduce its fabrication costs.

According to an additional feature of the invention, the fluid drive is adapted to produce turbulent flow of gas and vapor but substantially no splattering at the surface of the liquid. These features provide an enhanced rate of evaporation.

In a featured embodiment of the invention, the heating mechanism comprises a base defining a liquid reservoir, a heater for heating a liquid volume retained in the reservoir, and a vessel retainer for retaining the vessel in a position at least partially submerged in the liquid volume. The heated liquid volume enhances the evaporation process.

According to specific features of the above embodiment, the condenser is separable from the vessel and the fluid drive; and the base further defines a condenser retainer adapted to retain the condenser after separation from the vessel and a fluid drive retainer adapted to retain the fluid drive after separation from the condenser means. These features facilitate handling of the system's components during periods between evaporation cycles.

These and other objects and features of the invention will become more apparent upon a perusal of the following description taken in conjunction with the accompanying drawings wherein:

DESCRIPTION OF THE PREFERRED EMBODIMENT

Figure 1:
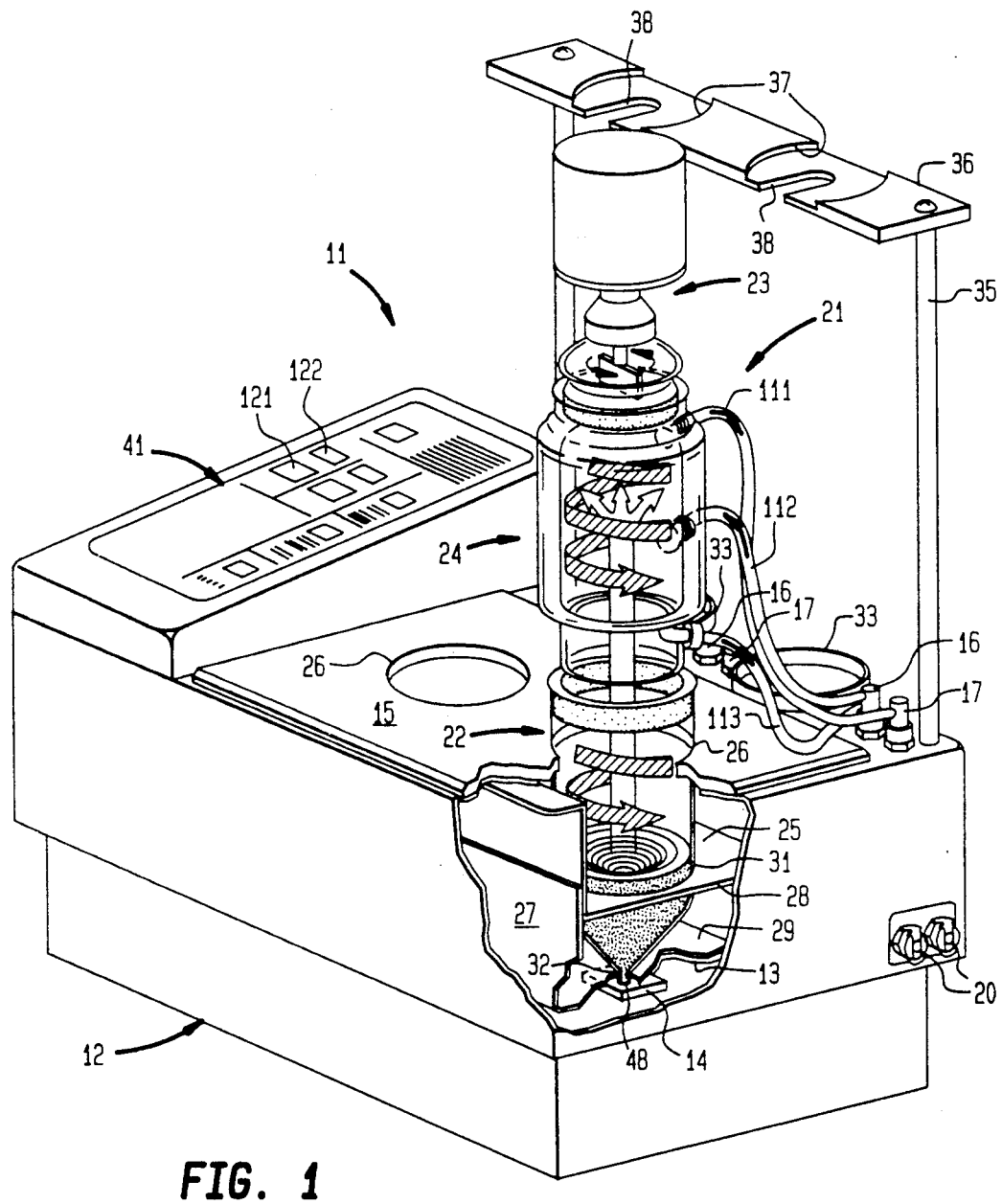
FIG. 1 is a perspective view of an evaporation system 11 according to the invention.

An evaporation system 11 illustrated in FIG. 1 includes a console base unit 12, and a strip heater element 13 and an evaporation sensor 14 retained thereby. Also included and retained by an upper surface 15 of the base unit 12 are a pair of supply fixtures 16 and a pair of return fixtures 17 communicating with fluid couplings 20 adapted for connection to a conventional source (not shown) of cooling fluid, such as a water tap and drain. An additional constituent of the evaporation system 11 is an evaporator assembly 21 consisting of an evaporation assembly 22, a fluid drive assembly 23 and a condenser assembly 24 straddled therebetween.

The base console 12 defines a reservoir 25 for retaining a liquid volume heated by the heater element 13. Formed in the upper surface 15 are spaced apart retainer openings 26, each for accommodating one of the evaporation vessels 22. A rack 27 having an upper shelf 28 and a lower shelf 29 is retained within the reservoir 25. Defined by the upper shelf 28 are a pair of retainer openings 31 axially aligned with the retainer openings 26 and the lower shelf 29 similarly defines a pair of also aligned smaller retainer openings 32. A pair of spaced apart cylindrical retainer recesses 33 extend upwardly from the upper surface 15 of the base console 12. Also extending upwardly from the upper surface 15 is an upright 35 having an upper end that retains a horizontally oriented support plate 36. Formed in the support plate 36 are a pair of mounting recesses 37, each of which is intersected by a mounting slot 38. The base console 12 further accommodates a control panel 41 mounted on the surface 15.

Figure 2:
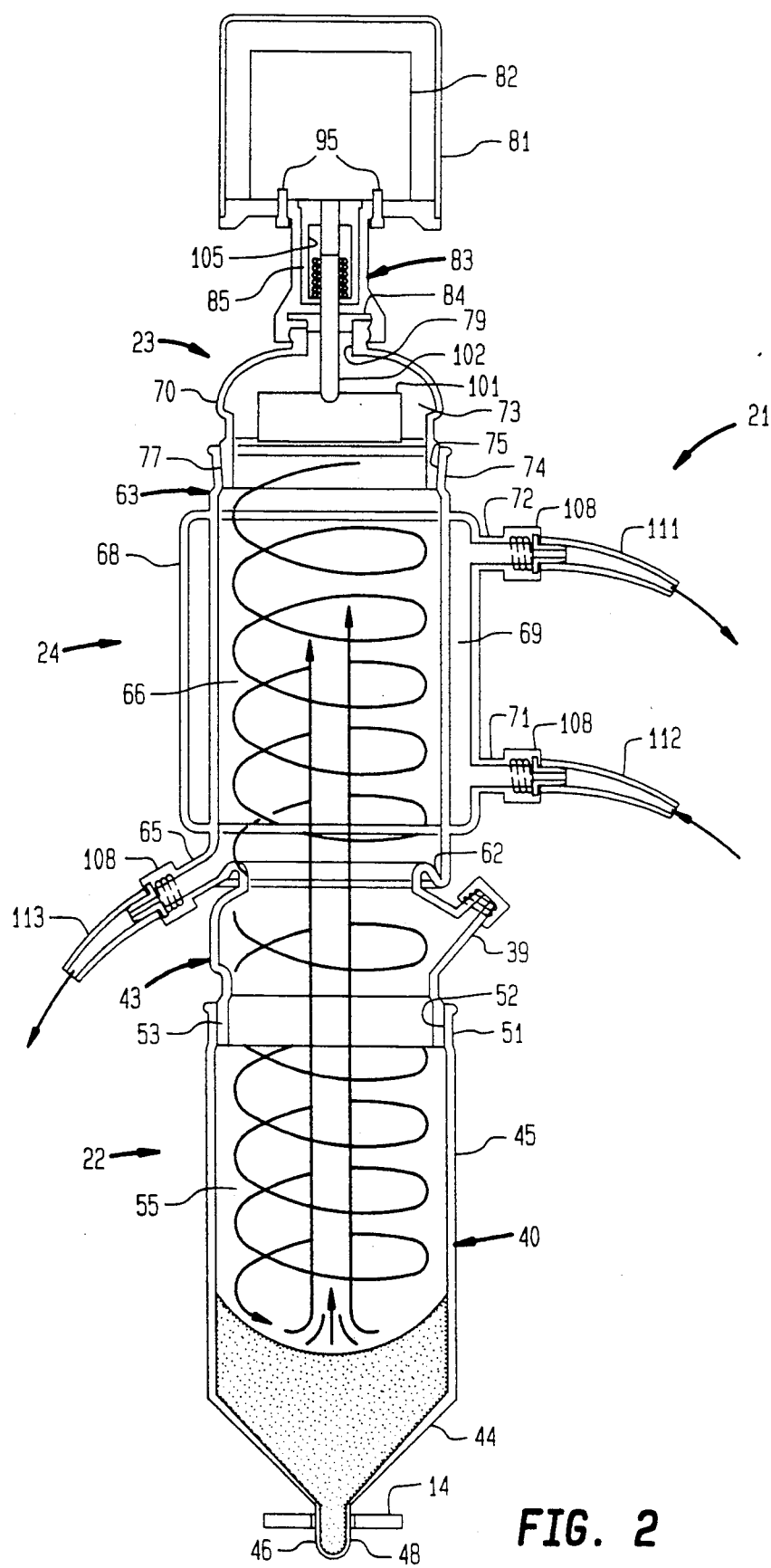
FIG. 2 is a cross sectional view of an evaporator assembly included in the evaporation system of FIG. 1.

As shown in FIG. 2, the evaporation assembly 22 includes a lower cylindrical vessel 40 and an upper solvent supply housing 43 defining a feed port 39, supported thereby. Forming the evaporation vessel 40, is a downwardly, inwardly tapering, hollow central portion 44 straddled by a hollow, cylindrical upper portion 45 and a hollow, tip portion 46. The outer surface of the upper cylindrical portion 45 is dimensioned to be slidably received by the aligned retainer openings 26, 31 in, respectively, the upper surface 15 and the upper shelf 28 while the tip portion 46 is dimensioned to be slidably received by the smaller retainer openings 32 in the lower shelf 29 (FIG. 1). Also receiving the tip portion 46 is a receiving cavity 48 in the evaporation sensor 14. Terminating the upper end of the upper cylindrical portion 45 is a collar portion 51 that defines a circular evaporator mouth 52. A lower nose portion 53 of the supply enclosure 43 is received by and closely fitted to the collar portion 51 so as to form therewith a hermetic seal. Together, the vessel 40 and the solvent supply enclosure 43 form an evaporation chamber 55.

The condenser assembly 24 includes a lower trough portion 62 and a hollow cylindrical, upper body portion 63. An outer periphery of the trough portion 62 is joined to the body portion 63 and an inner periphery thereof is joined to the supply enclosure 43 of the evaporation assembly 22. Communicating with the trough portion 62 is an externally threaded drain port 65. The cylindrical body portion 63 forms a condenser chamber 66 surrounded by an annular shroud 68 that defines therewith a cooling chamber 69. An externally threaded inlet port 71 and an externally threaded outlet port 72, respectively, are disposed at opposite ends of the cooling chamber 69. Terminating an upper end of the body portion 63 is a condenser collar portion 74 that defines a condenser mouth 75. Preferably, the cylindrical body portion 63, the annular trough portion 62, the supply housing 43 and the annular shroud 68 comprise an integral unit made of glass or other suitable material not susceptible to attack by organic solvents.

Figure 3:
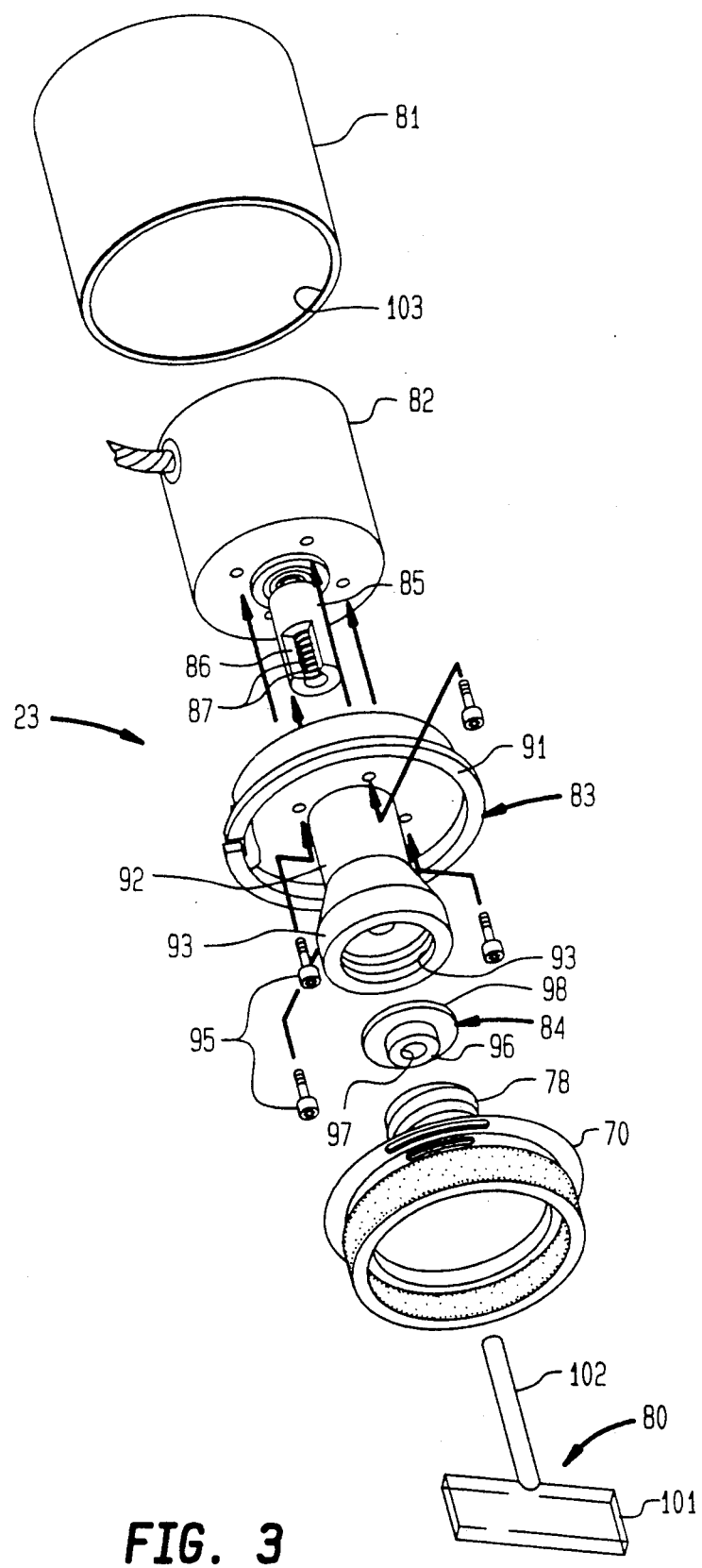
FIG. 3 is an exploded perspective view of a fluid drive assembly included in the evaporation system of FIG. 1.

As shown most clearly in FIG. 3, the fluid drive assembly 23 includes a hollow dome enclosure 70 that defines a fan chamber 73. Terminating a lower open end of the dome 70 is a condenser nose portion 77 that is received by and closely fitted to the condenser collar portion 74 so as to provide a hermetic seal therewith. An externally threaded neck 78 terminates an upper portion of the hollow dome 61 and defines an entry opening 79. The hollow dome 61 and the vessel 40 also are preferably made of glass or other suitable material not susceptible to attack by organic solvents.

Additional constituents of the fluid drive assembly 23 are a fan 80, a cylindrical motor case 81, a motor 82 retained thereby, a coupling element 83, and a seal member 84. Rotatably keyed to the motor 82 is a drive shaft 85 that defines a cylindrical recess 86 enclosing a plurality of O-rings 87. The coupling element 83 includes a centrally apertured cover portion 91; a hollow cylindrical middle portion 92 and an internally threaded, hollow shank portion 93. Securing the cover portion 91 to the motor 82 are a plurality of screws 95. The seal member 84 has a hollow cylindrical stopper portion 96 defining an entry orifice 97 and an outwardly extended flange portion 98. Forming the fan 80 is a rectangular paddle portion 101 and a stem portion 102 projecting therefrom.

After assembly of the fluid drive assembly 23, the cover portion 91 of the coupling element 83 is press fitted with the motor 82 into an open lower end 103 of the motor case 81. The drive shaft 85 is received by a hollow cavity 105 (FIG. 2) in the middle portion 92 of the coupling element 83. After positioning of the cylindrical stopper portion 96 into the entry opening 79 of the hollow dome 70, the externally threaded neck 78 thereof is threadedly engaged with the shank portion 93 of the coupling element 83 moving the flange portion 98 of the seal member 84 into engagement with a stop surface 107 (FIG. 3) formed at the bottom of the middle portion 92. The fan 80 then is assembled by inserting the stem portion 102 through the entry orifice 97 in the seal member 84 and the cavity 105 in the middle portion 92 of the coupling element 83 and into the cylindrical recess 86 for removable retention by the O-rings 87.

OPERATION

After complete assembly, an evaporator assembly 21 is placed in one set or, if desired in both sets of the retainer openings 26, 31, 32 as shown in FIG. 1. Next, threaded couplings 108 (FIG. 2) are used to connect an outlet tubing 111 between the outlet port 72 and the return fixture 17 and an inlet tubing 112 between the inlet port 71 and the supply fixture 16. In addition, a drain tubing 113 is connected by a threaded coupling 108 between the drain port 65 and a suitable collection vessel (not shown). A desirable rotational speed for the fan 80 is chosen by use of a selector 121 disposed on the panel 41 and connected to a control system (not shown) which regulates fan speed. Increasing fan speed increases the rate of evaporation. However, fan speed is limited to prevent excessive turbulence that would agitate the liquid sufficiently to splatter droplets of solvent (containing dissolved solute) in the evaporation vessel 40. Such droplets could be launched rom the liquid body and impinge on the condenser wall 63 resulting in a reduced recovery of dissolved solute. In addition, a temperature for the liquid bath in the reservoir 25 is chosen by use of another selector 122 on the panel 41. The selector 122 also is connected to a control system (not shown) which maintains a desired temperature for the liquid bath in the reservoir 25.

Once fan speed and bath temperature are selected, evaporation begins. The fan 80 directs air radially against the dome 70 creating along the wall of the evaporation chamber 55 a downwardly helical flow path that agitates or swirls a sample gently, creating a vortex action in the vessel 40. This vortex action, in combination with the applied heat increases the evaporation rate significantly with respect to prior systems. The fan action also serves to establish an equilibrium of vaporized solvent throughout the evaporation chamber 55. Solvent vapor naturally travelling upwardly from the center of the vortex is assisted by the action of the fan 80. When the vapor reaches the spinning fan 80, its action directs the vapor to the cool inner wall of the condenser 63. There, the vapor condenses and the condensed solvent travels down the inner wall of the body 63 until it reaches the trough 62. Collected liquid flows out of the trough 62 through the drain port 65 and the tubing 113 to a receptacle (not shown) for collecting the recovered solvent. In most cases, a practically pure condensed solvent is collected and may be used again to thereby reduce material costs. During the process, the sensor 14 monitors evaporation to provide for automated shutoff as disclosed, for example, in U.S. Pat. No. 4,707,452.

Upon completion of an evaporation cycle, the base console 12 facilitates handling of an evaporator assembly 21 during cleaning operations. After detachment of the tubings 111-113 with the threaded couplings 108, the condenser assembly 24 is separated from the evaporation assembly 22 by withdrawing the nose portion 53 of the housing portion 43 from the collar portion 51 of the vessel 40. Next, the dome 70 is separated from the cylindrical body portion 63 of the condenser assembly 24 by withdrawing the condenser nose portion 77 from the condenser collar portion 74. If cleaning of the dome 70 is desired, the fan 80 is removed by withdrawing the stem portion 102 from the O-rings 87 within the cylindrical recess 86 of the drive shaft 85. The dome 70 then can be disengaged from the coupling element 83.

After separation from the evaporator assembly 21, the fluid drive assembly 23 either with or without the dome 70 can be stored conveniently on the support plate 36. The mounting recesses 37 accommodate the motor case 81 while the mounting slots 38 accommodate the middle portion 92 of the coupling element 83. Similarly, after separation from the evaporation vessel 40, the unitary condenser assembly 24 and feed bousing 43 can be stored conveniently by inserting the nose portion 53 into one of the retainer recesses 33 on the upper surface 15 of the base 12. Proper care of the system's components is simplified, therefore, by the retainer mechanisms provided with the console base 12.

Obviously, many modifications and variations of the present invention are possible in light of the above teachings. It is to be understood, therefore, that the invention can be practiced otherwise than as specifically described.

What is claimed is:

1. Apparatus for removing solvent from a solution by evaporating the solvent, said apparatus comprising:
   vessel means defining a single opening at the top thereof and forming an evaporation chamber to hold a liquid composition;
   condenser means disposed above said vessel means and having wall means defining a condensation chamber sealed thereto, said condensation chamber having a first opening at its upper end and a second opening at its lower end, said second opening at said lower end communicating with said evaporation chamber through said single opening, said wall means further defining accumulator means for receiving liquid condensed on said wall means, and drain means for removing liquid received by said accumulator means;
   a fan chamber disposed above and sealed to said condenser means, said fan chamber defining a single opening at a bottom thereof, said single opening in said fan chamber communicating with said condensation chamber through said first opening in its upper end;
   fluid drive means comprising a fan disposed in said fan chamber for producing fluid flow downwardly through said single opening in said fan chamber, said second opening in said condensation chamber, and said single opening in said evaporation chamber into contact with the liquid composition in said evaporation chamber and then upwardly through said single opening in said evaporation chamber into said condensation chamber;
   heating means for heating the liquid composition in said evaporation chamber so as to cause evaporation thereof and wherein said fan produces in said vessel means fluid flow in a helical path above the liquid composition thereby enhancing evaporation thereof; and
   cooling means for cooling said wall means so as to produce condensation thereon of vapor included in the fluid flowing upwardly from said evaporation chamber.

2. An apparatus according to claim 1 wherein said wall means comprises a substantially vertical condensation tube, said accumulator means comprises an annular trough terminating a bottom of said tube, and said drain means comprises a drain port in a bottom of said trough.

3. An apparatus according to claim 2 wherein said tube and said annular trough are an integrally formed unit.

4. An apparatus according to claim 3 wherein said unit is formed from glass.

5. An apparatus according to claim 2 wherein said cooling means comprises an annular shroud surrounding said tube and defining a fluid inlet port and a fluid outlet port.

6. An apparatus according to claim 5 wherein said tube, said annular trough and said annular shroud are an integrally formed unit.

7. An apparatus according to claim 6 wherein said unit is formed from glass.

8. An apparatus according to claim 2 including a closed supply housing means sealed between said condenser means and said vessel means; said supply means defining a feed port for injecting a solvent into said vessel means.

9. An apparatus according to claim 8 wherein said tube, said annular trough and said supply housing means are an integrally formed unit.

10. An apparatus according to claim 9 wherein said unit is formed from glass.

11. An apparatus according to claim 1 including a closed supply housing means sealed between said condenser means and said vessel means; said supply means defining a feed port for injecting a solvent into said vessel means.

12. An apparatus according to claim 1 wherein said vessel means comprises a tubular vessel having an inner wall and said fan produces said fluid flow in a helical path along said inner wall and into intimate contact with the liquid composition.

13. An apparatus according to claim 1 wherein said heating means comprises base means defining a liquid reservoir, heater means for heating a liquid volume retained in said reservoir, and vessel retainer means for retaining said vessel means in a position at least partially submerged in said liquid volume.

14. An apparatus according to claim 13 wherein said condenser means is separable from said vessel means and said fluid drive means; and said base means further defines condenser retainer means for retaining said condenser means after separation from said vessel means and fluid drive retainer means for retaining said fluid drive means after separation from said condenser means.

* * * * *